US011467825B1

(12) United States Patent
Frackiewicz

(10) Patent No.: US 11,467,825 B1
(45) Date of Patent: Oct. 11, 2022

(54) METHOD AND SYSTEM FOR A CUSTOMIZED LOCAL BUILD ENVIRONMENT IMAGE

(71) Applicant: BlackBerry Limited, Waterloo (CA)

(72) Inventor: Karol Frackiewicz, Kitchener (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 17/198,872

(22) Filed: Mar. 23, 2021

(51) Int. Cl.
*G06F 9/44* (2018.01)
*G06F 8/71* (2018.01)
*G06F 21/10* (2013.01)
*G06F 8/41* (2018.01)
*G06F 8/76* (2018.01)

(52) U.S. Cl.
CPC ............. *G06F 8/71* (2013.01); *G06F 8/447* (2013.01); *G06F 8/76* (2013.01); *G06F 21/105* (2013.01)

(58) Field of Classification Search
CPC ... G06F 8/71; G06F 8/447; G06F 8/76; G06F 21/105
USPC ........................................................ 717/120
See application file for complete search history.

(56) References Cited

U.S. PATENT DOCUMENTS

| 10,250,522 | B1* | 4/2019 | Anderson | H04L 47/70 |
| 10,671,384 | B1 | 6/2020 | Boynes | |
| 11,062,022 | B1* | 7/2021 | Kalamkar | G06F 21/577 |
| 2010/0115401 | A1* | 5/2010 | Nordine | G06F 40/166 |
| | | | | 715/764 |
| 2010/0269096 | A1* | 10/2010 | Araya | G06F 8/71 |
| | | | | 717/113 |
| 2016/0212118 | A1* | 7/2016 | Barrall | H04L 63/08 |
| 2017/0249141 | A1* | 8/2017 | Parees | G06F 11/3668 |
| 2018/0137296 | A1* | 5/2018 | Cahana | G06F 21/629 |
| 2019/0227794 | A1* | 7/2019 | Mercille | G06F 8/36 |
| 2020/0154594 | A1* | 5/2020 | Matthews | E01C 3/006 |
| 2020/0183766 | A1* | 6/2020 | Kumar-Mayernik | H04L 9/3239 |
| 2020/0218798 | A1* | 7/2020 | Kosaka | G06F 9/455 |
| 2020/0327102 | A1* | 10/2020 | Zhang | G06F 11/1453 |
| 2020/0371898 | A1* | 11/2020 | Aouad | G06F 11/3616 |
| 2021/0089361 | A1* | 3/2021 | Rafey | G06F 9/505 |
| 2021/0374693 | A1* | 12/2021 | La Salle | G06Q 20/3829 |

FOREIGN PATENT DOCUMENTS

| CN | 106095523 A | 11/2016 |
| CN | 111198744 A | 5/2020 |
| CN | 111381829 A | 7/2020 |

OTHER PUBLICATIONS

Title: The comparison of container orchestrators, author: L Mercl et al, published on 2019.*
Title: A performance study of containers in cloud environment, author: B Ruan et a;. published on 2016.*

(Continued)

*Primary Examiner* — Chameli Das
(74) *Attorney, Agent, or Firm* — Moffat & Co

(57) ABSTRACT

A method at a computing device including obtaining a first container image from a host computing device; executing a second container image at the computing device, the executing comprising: starting a container from the first container image, the container being for a development environment on the computing device; and customizing the container for a local environment on the computing device, thereby creating a customized container; and compiling developed code within the customized container.

10 Claims, 6 Drawing Sheets

(56) References Cited

OTHER PUBLICATIONS

Title: Automatically generating personalized user interfaces with Supple; author: KZ Gajos, published on 2010.*
International Search Report and Written Opinion, PCT Application No. PCT/CA2022/050416, dated Jun. 16, 2022.
"Overview of Docker Compose", published on the Internet Feb. 26, 2015, retrieved from https://docs.docker.com/compose/.

* cited by examiner

METHOD AND SYSTEM FOR A CUSTOMIZED LOCAL BUILD ENVIRONMENT IMAGE

FIELD OF THE DISCLOSURE

The present disclosure relates to software development environments, and in particular relates to containerized software development environments.

BACKGROUND

Typically, the development and compilation of software requires installation of a stack of tools and utilities. Such stack of tools and utilities are frequently platform, version, and architecture specific. To create such an environment requires extensive manual setup, as well as the monitoring for and applying of updates as available, wasting developer efforts.

One option to simplify the development environment is to use a containerized solution. Specifically, a container may be thought of as a unit of software that packages code and dependencies so that an application may run quickly and reliably from one computing environment to another. Containers run on a container engine and can include container engines provided by Docker, Inc. of San Francisco, Calif., a Windows Server container by Microsoft Corporation of Redmond Wash., a Linux container or LXC, among other options.

However even with such containerized environments, the source code being developed in the container needs to be copied into the container, built, and then build artifacts copied back to a host machine. Additionally, any licenses required for compilation must also be copied to such container.

BRIEF DESCRIPTION OF THE DRAWINGS

The present disclosure will be better understood with reference to the drawings, in which.

DETAILED DESCRIPTION OF THE DRAWINGS

Figure 1:
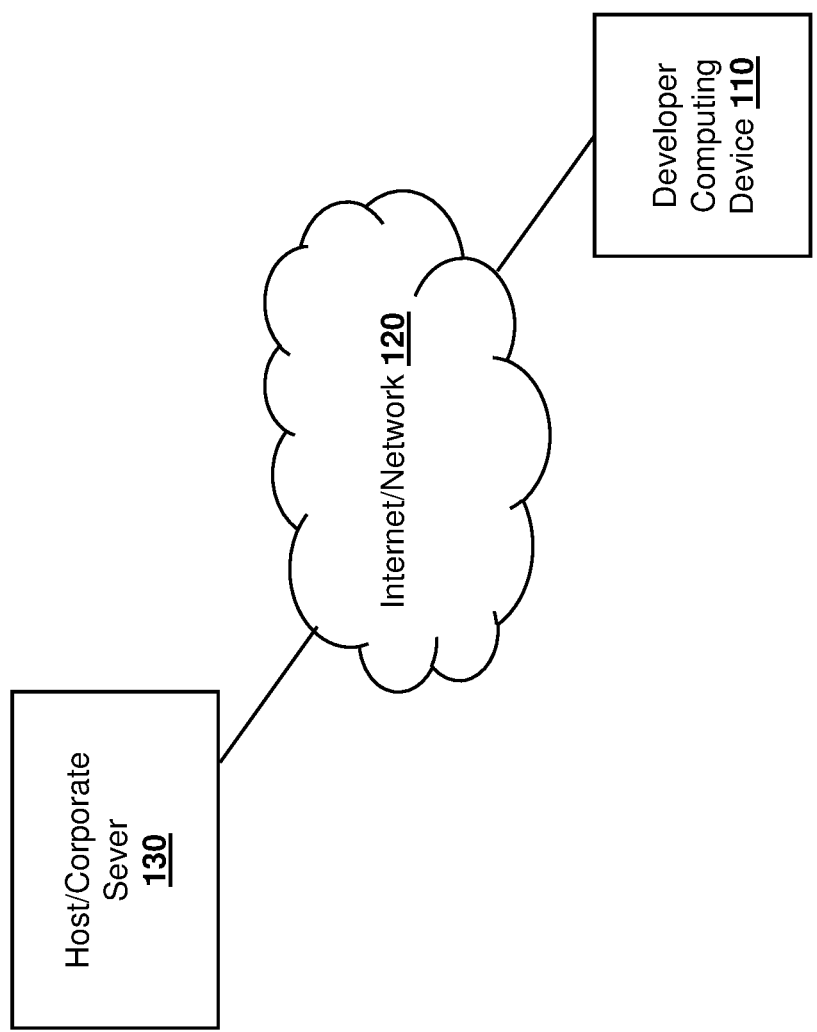
FIG. 1 is a block diagram showing an example computing system capable of being used with the embodiments of the present disclosure.

The present disclosure provides a method at a computing device comprising: obtaining a first container image from a host computing device; executing a second container image at the computing device, the executing comprising: starting a container from the first container image, the container being for a development environment on the computing device; and customizing the container for a local environment on the computing device, thereby creating a customized container; and compiling developed code within the customized container.

The present disclosure further provides a computing device comprising: a processor; and a communications subsystem, wherein the computing device is configured to: obtain a first container image from a host computing device; execute a second container image at the computing device, the execution comprising: starting a container from the first container image, the container being for a development environment on the computing device; and customizing the container for a local environment on the computing device, thereby creating a customized container; and compile developed code within the customized container.

The present disclosure further provides a computer readable medium for storing instruction code which, when executed by a processor on a computing device cause the computing device to: obtain a first container image from a host computing device; execute a second container image at the computing device, the execution comprising: starting a container from the first container image, the container being for a development environment on the computing device; and customizing the container for a local environment on the computing device, thereby creating a customized container; and compile developed code within the customized container.

In accordance with embodiments of the present disclosure, a customized local build environment image overcomes issues dealing with the setting up a local development environment or providing a development environment within a container. The custom local build environment image uses a standard base image, which may also be used in continuous integration/continuous distribution (CI/CD) builds, to generate a new image that is customized to a particular user and host machine.

The customized local build environment image provides the project source code, as well as all licenses and configuration files that are needed for the project as mounts within the container to allow direct access with a bidirectional flow of information.

The compilation process reads data directly from a local directory and writes output directly to that directory. Additionally, the customized local build environment duplicates the local user and group inside the container to allow read/write access with the same user and group identifiers.

The customized local build environment image is implemented utilizing a build process that generates a custom image and launches the container.

Example Containerized System

The present disclosure will be described with regard to a Docker system using Docker Images and containers. However, this is merely provided for illustration purposes and the methods and systems described herein could equally be used with any other containerization system.

For example, reference is now made to FIG. 1 which shows a developer computing device 110 which may be any computing device that a developer uses to create, test, and build software. As described below, due to the nature of the container development, the operating system and type of computing device 110 can vary between developers without compromising the development environment.

The developer computing device 110 may communicate utilizing a network such as the Internet 120 with a host or corporate server 130, where such server may contain a repository to store the code being developed, and standard container images, among other information. Network or Internet 120 may be any network capable of allowing communication between the computing device 110 and the host or server 130, and may include a local area network, a wide area network, among other options. Communications between the network or Internet 120 and the computing device 110 can utilize any wired or wireless communication technology. Similarly, communications between the host or server 130 and the network or Internet 120 can use any wired or wireless communication technology.

Figure 2:
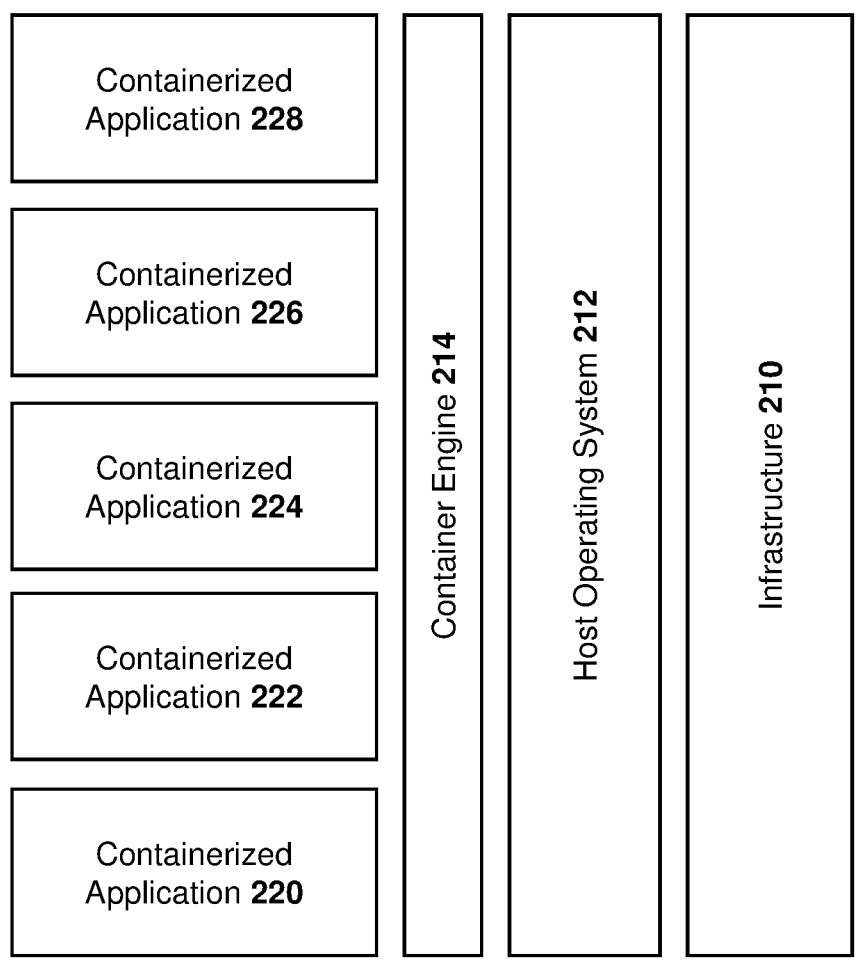
FIG. 2 is a block diagram showing containers running on a container engine independent of an operating system.

Due to the use of containers on the local computing device 110, a container engine may be installed on such computing device. Reference is now made to FIG. 2, which shows an example of the structure for the use of containers on a computing device.

In particular, in the embodiment of FIG. 2, the infrastructure for the computing device is shown at layer 210. A host operating system 212 runs on top of such infrastructure layer 210.

In order to permit containers to be run and be independent of the host operating system 212, a container engine 214 serves as an abstraction layer between containers and the host operating system 212.

In the example of FIG. 2, a plurality of containerized applications are shown to be running on top of the container engine 214. In particular, in the example of FIG. 2, five containerized applications, namely applications 220, 222, 224, 226 and 228 are shown. The number and type of applications that are provided in FIG. 2 are merely provided as examples, and any number of containerized applications may be running using a container engine 214 depending on the needs of the user, and the ability for infrastructure 210 to support such number of containers.

Creating a Container Development Environment

As provided above, a container environment offers the possibility to a package of the development environment as an image and to build software inside a container. However, this still requires a considerable manual setup and manual steps after compilation.

Figure 3:
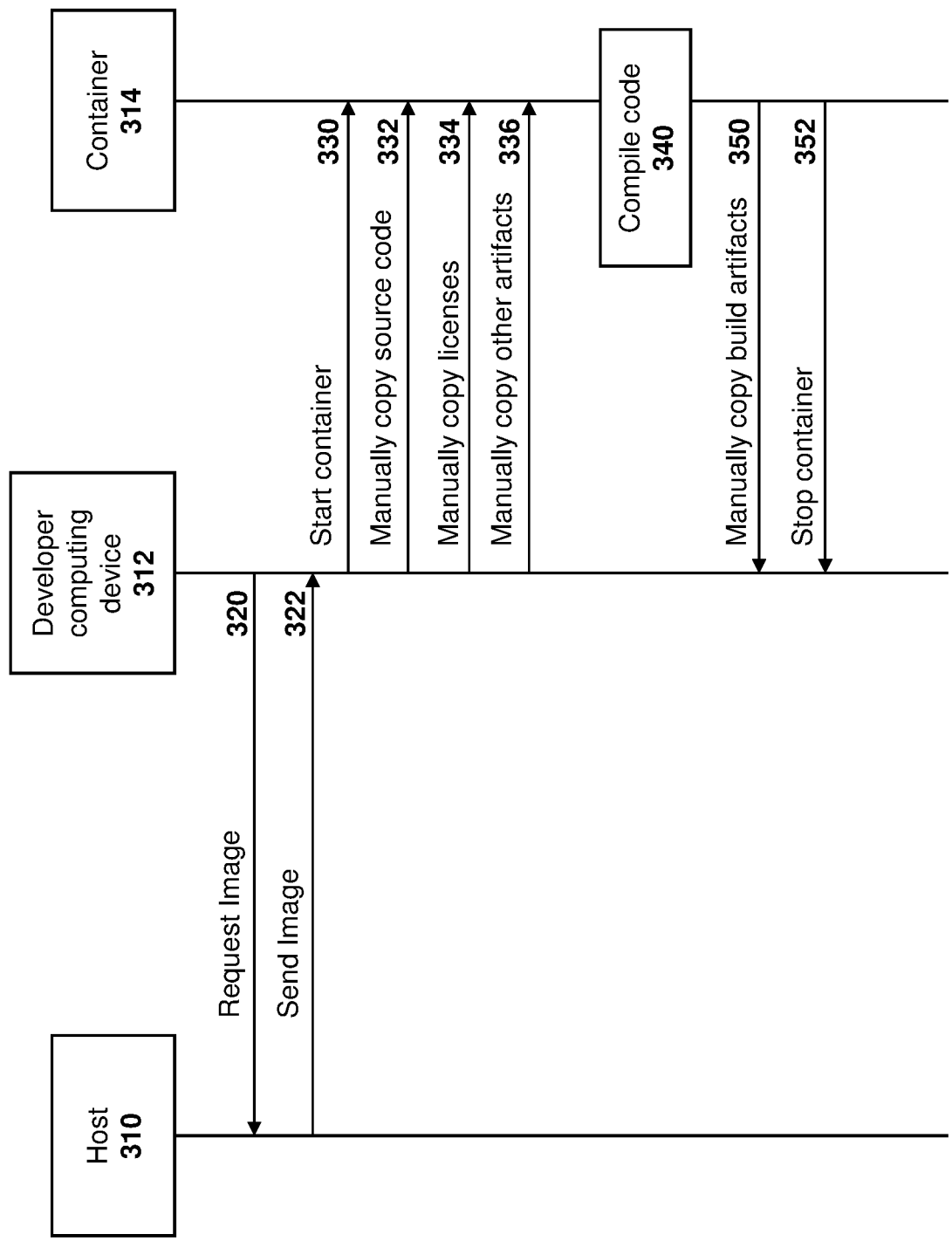
FIG. 3 is a dataflow diagram showing a process for creating a containerized development environment manually.

Reference is now made to FIG. 3, which shows an example for the use of a container in a traditional development environment. In particular, in the embodiment of FIG. 3, a host 310 may contain the repository for a software project that is being developed. A computing device 312 may be a local developer's computing device. A container 314 may be the container that the code is being developed in.

The developer wanting to develop code from the host 310 may request an image, as shown at message 320, and may receive the image as shown at message 322.

Based on the received image at message 322, the developer computing device 320 may start a container as shown at message 330.

Thereafter, as shown at arrow 332, the developer must manually copy the source code to the container.

Further, as shown at arrow 334, the developer must manually copy any required licenses to the container 314.

Further, as shown at arrow 336, the developer must manually copy any other artifacts needed for the development environment to the container 314.

Only once the source code, licenses and artifacts are copied to the container 314 can the container 314 be used to compile code, as for example shown at block 340.

Once the code has been compiled, the developer must then manually copy any build artifacts from the container 314 to the computing device 312, as shown at arrow 350.

Only then can the developer stop the container as shown at arrow 352.

The requirement to perform all of the manual copying at arrows 332, 334, 336 and 350 takes significant developer time and effort.

Customized Local Build Environment Image

In accordance with various embodiments of the present disclosure, a standard base image can be converted, utilizing a local development environment image, into a local development environment.

Figure 4:
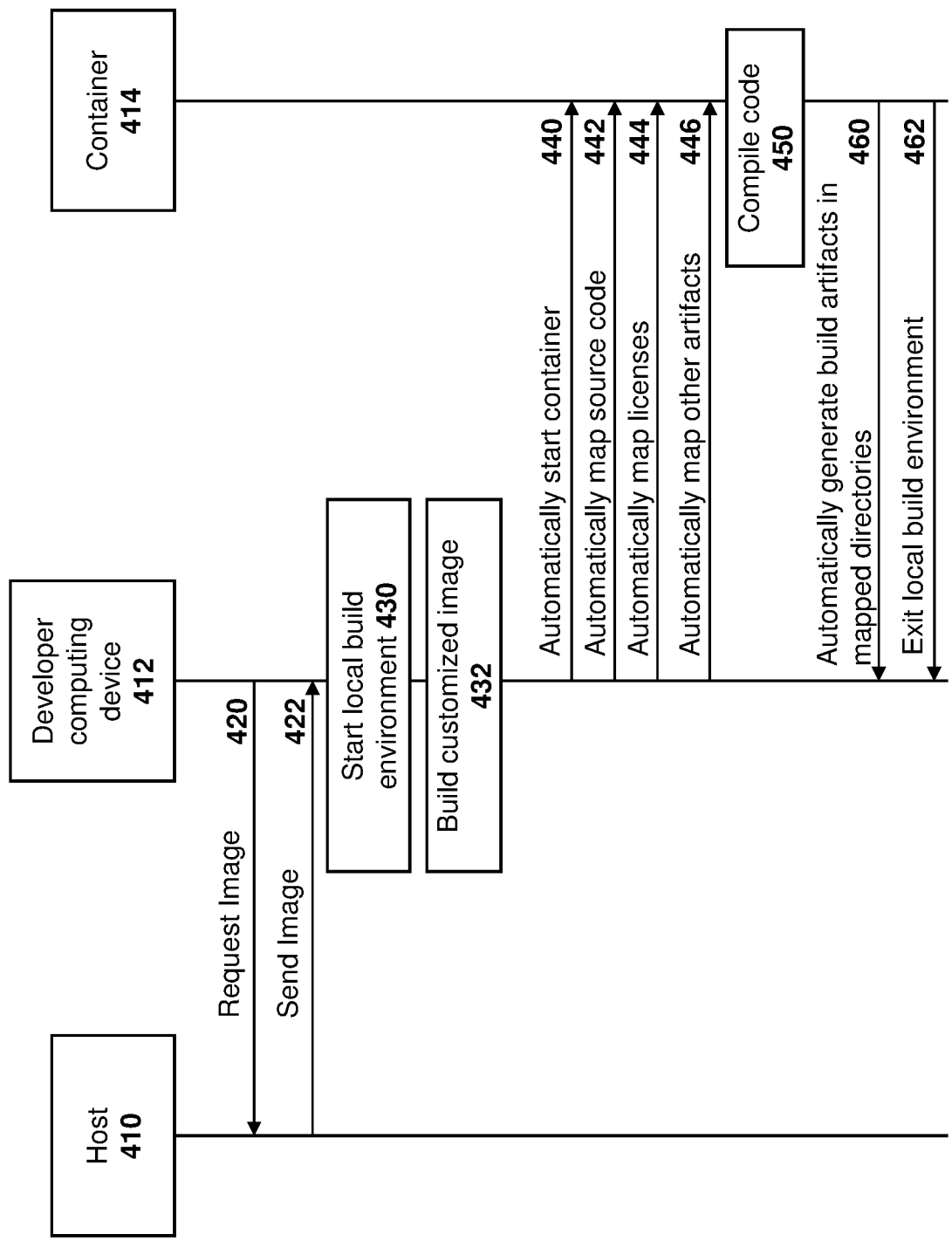
FIG. 4 is a dataflow diagram showing a process for creating a containerized development by creating a customized local image.

In particular, reference is now made to FIG. 4. In the embodiment of FIG. 4, a host 410 may include a standard base image for use in a development environment.

A developer computing device 412 may communicate with host 410 and may further start a development environment container 414 as described below.

As with the embodiment of FIG. 3, in the embodiment of FIG. 4 a developer computing device 412 requests an image from host 410, as shown by message 420. In response, the basic image for the development is returned as message 422.

Subsequently, the developer computing device 412 may start a local build environment, as shown at block 430. Further, a customized image for the developer computing device 412 may then be created at block 432. Examples of the starting and the building of the customized image are provided below.

Once the customized image is created, the container may be automatically started as shown by arrow 440 utilizing the customized image to create the container.

The source code may also automatically be mapped, as shown with arrow 442, based on the customized image.

Further, the licenses required may be automatically mapped as shown at arrow 444, based on the customized image built at block 432.

Further, other artifacts may automatically be mapped as shown by arrow 446 based on the customized image at block 432.

In this way, container 414 has all the source code, licenses and artifacts that are required to create a local development environment for a developer without requiring the developer to manually configure and create such environment, thereby saving developer resources.

Once the container is configured, and the code has been developed, then it may be compiled at block 450. The container may automatically generate build artifacts that are needed at the developer computing device 412 and provide these in message 460.

The local build environment may then be exited, as shown at block 462.

Figure 5:
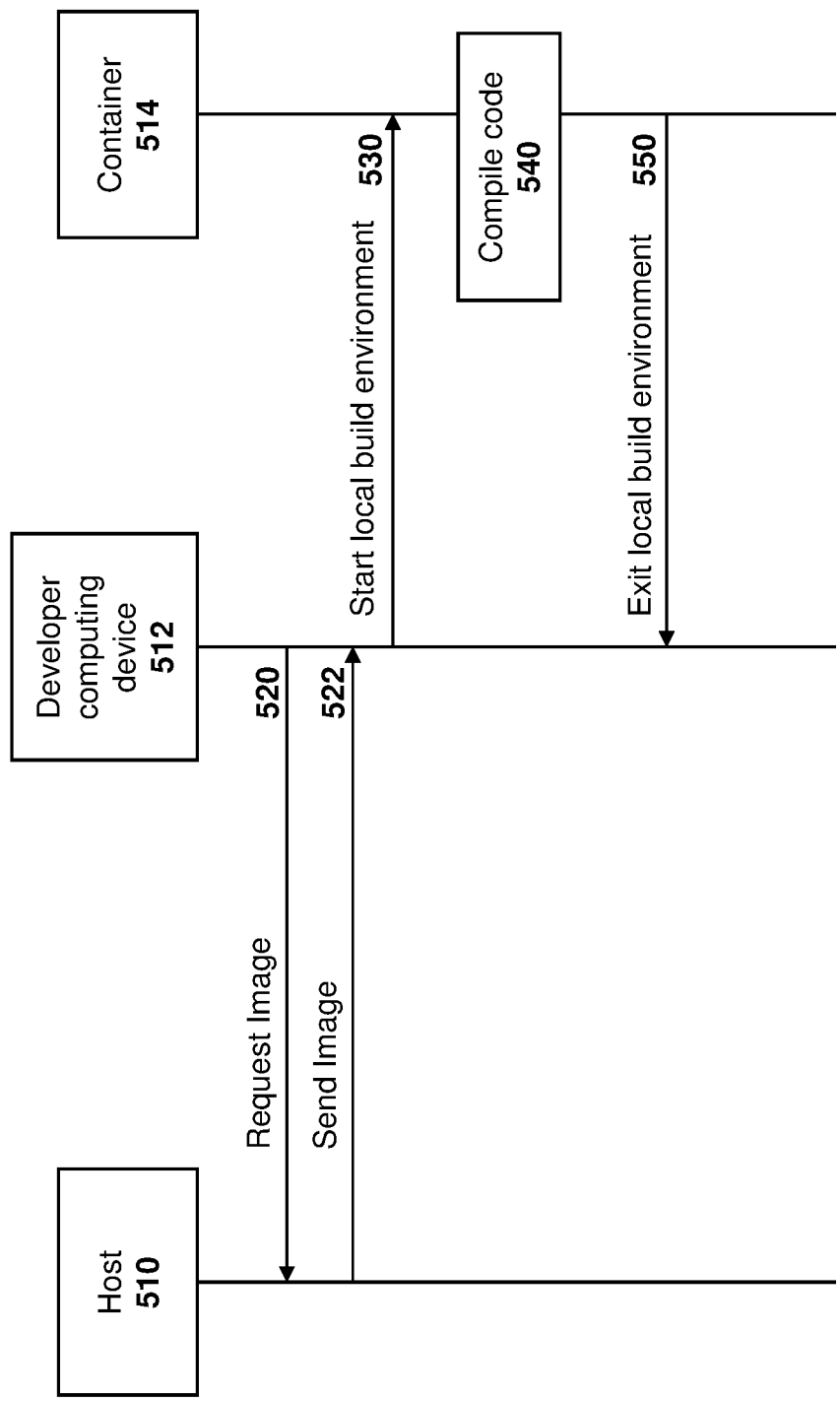
FIG. 5 is a dataflow diagram showing a process for creating a containerized development from a developer's perspective.

From a developer perspective, reference is now made to FIG. 5. In particular, in the embodiment of FIG. 5, a developer using developer computing device 512 may request an image from host 510, as shown by message 520. The image is returned in message 522.

The developer may then start the local build environment as shown with arrow 530, creating container 514 automatically. The developer may then compile the code at block 540 and exit the local build environment at block 550.

Therefore, from a developer's perspective, the embodiment of FIG. 5 provides a much simpler way to provide a development environment than that of the embodiment of FIG. 3.

One example utilizing Docker to create a local build image to compile code is provided below. This example is simplified and is merely provided for illustration purposes.

In the example, code that needs to be compiled may include a "Hello World" program written in C, for example shown in Table 1 below.

TABLE 1

Example Code to be Compiled

```
#include <stdio.h>
int main( ) {
    printf("Hello, World!\n");
    return 0;
}
```

The standard image that may be obtained from the host as shown, for example, in FIGS. 4 and 5, may be a file named "Dockerfile" in the present example. One example of the Dockerfile is shown in Table 2 below.

TABLE 2

Example Standard Image

```
FROM alpine:3.13.1
RUN apk add --update bash build-base shadow sudo
RUN addgroup -S builder && \
    adduser -G builder -S -D builder && \
    echo "builder ALL=(ALL) NOPASSWD:ALL" > /etc/sudoers.d/builder && \
    mkdir -p /builds/workspace && \
    chown -R builder:builder /builds
USER builder
WORKDIR /builds/workspace
ENTRYPOINT ["/bin/sh", "-c" ]
CMD [ "/bin/bash" ]
```

Dockerfile from Table 2 is used to build an image for use in CI/CD and contains a use "builder" and starts in directory "/builds/workspace", where the builder user can clone the repository and compile code.

A third file that may be part of the local build environment is referred to in the present example as "Dockerfile.local". This file provides a definition of the local build environment they can be used to compile the code in a container executing locally on a developer machine such as developer computing device 412 or developer computing device 512. An example of such file as provided in Table 3 below.

TABLE 3

Example Custom Local Image

```
FROM sample_cicd_image
ARG local_group_id
ARG local_group_name
ARG local_user_id
ARG local_user_name
ARG local_home_dir
USER root
RUN apk add --update curl openssh shadow && \
    echo "Creating group \"${local_group_name}\" (GID=${local_group_id})" && \
    (groupadd -f -g $local_group_id -o -r $local_group_name || echo Group ID $local_group_id already exists.) && \
    echo "Creating user \"${local_user_name}\" (UID=${local_user_id})" && \
    (useradd -d ${local_home_dir} -g ${local_group_id} -o -u ${local_user_id} -M -N -r -s /bin/sh ${local_user_name} || echo User ID ${local_user_id} already exists.) && \
    mkdir -p ${local_home_dir} && chown -R ${local_user_name}:${local_group_name} ${local_home_dir} && \
    mkdir -p ${local_home_dir}/.local && chown -R ${local_user_name}:${local_group_name} ${local_home_dir}/.local && \
    mkdir -p ${local_home_dir}/.cache && chown -R ${local_user_name}:${local_group_name} ${local_home_dir}/.cache && \
    echo "${local_user_name} ALL=(ALL) NOPASSWD:ALL" > /etc/sudoers.d/${local_user_name}
ENV PATH="${PATH}:$local_home_dir/.local/bin"
```

TABLE 3-continued

Example Custom Local Image

```
USER $local_user_name
ARG workdir
WORKDIR $workdir
RUN echo -e "\ntest -f ~/.bashrc-host && source ~/.bashrc-host || false" >> ~/.bashrc
```

From Table 3 above, the local build environment can be used to compile the code in a container executing locally on a developer machine, with a local username, identifier, group name and group identifiers duplicated in the image.

A fourth file that can be used to create the local build environment is a configuration file (in the present example the configuration file is a Yet Another Markup Language (YAML) file), referred to herein as "docker-compose.local.yml". This is a compose definition that can be used to run the local build environment with all arguments passed in, and all relevant local files and directories mounted in the container. An example of such file as provided in Table 4 below.

TABLE 4

Example Local Compose File

```
Version: '3'
services:
    sample_local_environment:
        privileged: true
        build:
            context:.
            dockerfile: Dockerfile.local
            args:
                - workdir=${PWD}
                - local_group_name
                - local_group_id
                - local_user_name
                - local_user_id
                - local_home_dir=${HOME}
        cap_drop:
            -ALL
        network_mode: host
        environment:
            TERM: xterm-256color
            debian_chroot: DOCKER
        volumes:
            - ${HOME}/.ssh:${HOME}/.ssh
            - ${HOME}/.bashrc:${HOME}/.bashrc-host
            - ${PWD}:${PWD}
            - ${PWD}/git-prompt.sh:${HOME}/.git-prompt.sh
```

Further, building instructions may be provided in a "Makefile", an example of which is provided in Table 5 below.

TABLE 5

Example Makefile

```
.phony: docker build_local_environment local_environment all
.docker.lock:
    @echo "Building a Sample Image for use in CI/CD pipeline."
    docker build -t sample_cicd_image .
    @echo "Image built, tagged as sample_cicd_image. Not uploading to remote registry, but could."
    touch .docker.lock
docker: .docker.lock
.local_environment.lock: .docker.lock
    docker-compose -f docker-compose.local.yml build \
    --build-arg local_user_name=$$(id -u -n) \
    --build-arg local_user_id=$$(id -u) \
    --build-arg local_group_name=$$(id -g -n) \
```

TABLE 5-continued

Example Makefile

```
    --build-arg local_group_id=$$(id -g) \
    sample_local_environment && \
    touch .local_environment.lock
local_environment: .local_environment.lock
    docker-compose -f docker-compose.local.yml run --rm
sample_local_environment
clean:
    rm -rf .local_environment.lock .docker.lock hello
hello: hello.c
    cat /etc/os-release | grep "Alpine Linux" > /dev/null && gcc -o
hello hello.c || echo Can only compile under Alpine Linux
```

In the sample code above, the Makefile specifically requires that the C code is compiled using Alpine Linux. If the code is compiled on another host using a "make" command, the following error in Table 6 would be displayed.

TABLE 6

Example attempt to compile on non-permitted host

```
$ make hello
cat /etc/os-release | grep "Alpine Linux" > /dev/null && gcc -o
hello hello.c || echo Can only compile under Alpine Linux
cat: /etc/os-release: No such file or directory
Can only compile under Alpine Linux
$
```

Table 6 demonstrates that the code cannot be built unless using an Alpine Linux host.

Conversely, once the basic image is obtained, the local build environment can be created on the developers computing device. For example, Table 7 below shows the creation of the local build environment using a "make local_environment" command. The various steps from the makefile in Table 5 above may produce the following execution data.

TABLE 7

Example output from local environment build

```
$ make local_environment
Building a Sample Image for use in CI/CD pipeline.
docker build -t sample_cicd_image .
Sending build context to Docker daemon 27.14kB
Step 1/7 : FROM alpine:3.13.1
---> e50c909a8df2
Step 2/7 : RUN apk add --update bash build-base shadow sudo
---> Using cache
---> 932a1c2720ed
Step 3/7 : RUN addgroup -S builder && adduser -G builder -S -D
builder && echo "builder ALL=(ALL) NOPASSWD:ALL" >
/etc/sudoers.d/builder && mkdir -p /builds/workspace && chown -R
builder:builder /builds
---> Using cache
---> 5681409c5f10
Step 4/7 : USER builder
---> Using cache
---> 49d3fc10500d
Step 5/7 : WORKDIR /builds/workspace
---> Using cache
---> e5d33c5b7fe8
Step 6/7 : ENTRYPOINT [ "/bin/sh", "-c" ]
---> Using cache
---> 1bb3ee01439e
Step 7/7 : CMD [ "/bin/bash" ]
---> Using cache
---> fa25bb228a78
Successfully built fa25bb228a78
Successfully tagged sample_cicd_image:latest
```

TABLE 7-continued

Example output from local environment build

```
Image built, tagged as sample_cicd_image. Not uploading to
remote registry, but could.
    touch .docker.lock
    docker-compose -f docker-compose.local.yml build \
        --build-arg local_user_name=$(id -u -n) \
        --build-arg local_user_id=$(id -u) \
        --build-arg local_group_name=$(id -g -n) \
        --build-arg local_group_id=$(id -g) \
        sample_local_environment && \
        touch .local_environment.lock
Building sample_local_environment
Step 1/13 : FROM sample_cicd_image
---> fa25bb228a78
Step 2/13 : ARG local_group_id
---> Using cache
---> 8fc55f9c7c3a
Step 3/13 : ARG local_group_name
---> Using cache
---> 85639386b4ef
Step 4/13 : ARG local_user_id
---> Using cache
---> 9b49d47bae34
Step 5/13 : ARG local_user_name
---> Using cache
---> 9f969a4abecc
Step 6/13 : ARG local_home_dir
---> Using cache
---> b8d77158f2d7
Step 7/13 : USER root
---> Using cache
---> ec25136fd4c9
Step 8/13 : RUN apk add --update curl openssh shadow &&
echo "Creating group \"${local_group_name}\" (GID=${local_group_id})"
&& (groupadd -f -g $local_group_id -o -r $local_group_name || echo
Group ID $local_group_id already exists.) && echo "Creating user
\"${local_user_name}\" (UID=${local_user_id})"&& (useradd -d
${local_home_dir} -g ${local_group_id} -o -u ${local_user_id} -M -N -r
-s
/bin/sh ${local_user_name} || echo User ID ${local_user_id} already
exists.) && mkdir -p ${local_home_dir} && chown -R
${local_user_name}:${local_group_name} ${local_home_dir} && mkdir
-p ${local_home_dir}/.local && chown -R
${local_user_name}:${local_group_name} ${local_home_dir}/.local &&
mkdir -p ${local_home_dir}/.cache && chown -R
${local_user_name}:${local_group_name} ${local_home_dir}/.cache &&
echo "${local_user_name} ALL=(ALL) NOPASSWD:ALL" >
/etc/sudoers.d/${local_user_name}
---> Using cache
---> fb7d7efb16ed
Step 9/13 : ENV PATH="${PATH}:$local_home_dir/.local/bin"
---> Using cache
---> dfa2a73a63c3
Step 10/13 : USER $local_user_name
---> Using cache
---> 6a6adccbcc7a
Step 11/13 : ARG workdir
---> Using cache
---> b6add0e99879
Step 12/13 : WORKDIR $workdir
---> Using cache
---> 1d6fda591835
Step 13/13 : RUN echo -e "\ntest -f ~/.bashrc-host && source
~/.bashrc-host || false" >> ~/.bashrc
---> Using cache
---> 55bd01b746ac
Successfully built 55bd01b746ac
Successfully tagged patent_sample_local_environment:latest
docker-compose -f docker-compose.local.yml run --rm
sample_local_environment
Creating patent_sample_local_environment_run ... done
(DOCKER)$
```

As seen from Table 7, first the development container is built. In the example of Table 7 this involves seven steps including adding directories and users.

Next, from Table 7 the local image is composed using the "docker-compose.local.yml file of Table 4 above. This involves 13 steps in the example of Table 7, including defining local users, groups and environments.

At the end of Table 7, the run environment is in the local, custom built Docker image. From this point, the code can be compiled, as for example provided in Table 8 below.

TABLE 8

Example compilation of code in container

```
(DOCKER)$ make hello
    cat /etc/os-release | grep "Alpine Linux" > /dev/null && gcc -o
hello hello.c || echo Can only compile under Alpine Linux
    (DOCKER)$ ./hello
    Hello, World!
    (DOCKER)$
```

From Table 8, the hello.c file of Table 1 is successfully compiled. The docker program could then be exited and the binary for the compiled program will exist in a current directory on the local machine. However, as the binary is outside of the container, it may not be able to be executed on some computing device operating systems.

Based on the above, a customized local development environment can be created from a standard image by applying a development image configured with local parameters.

The above computing devices, servers, network nodes or computers may be implemented using any computing device. One simplified diagram of a computing device is shown with regard to FIG. 6. The computing device of FIG. 6 could be any fixed or mobile computing device.

Figure 6:
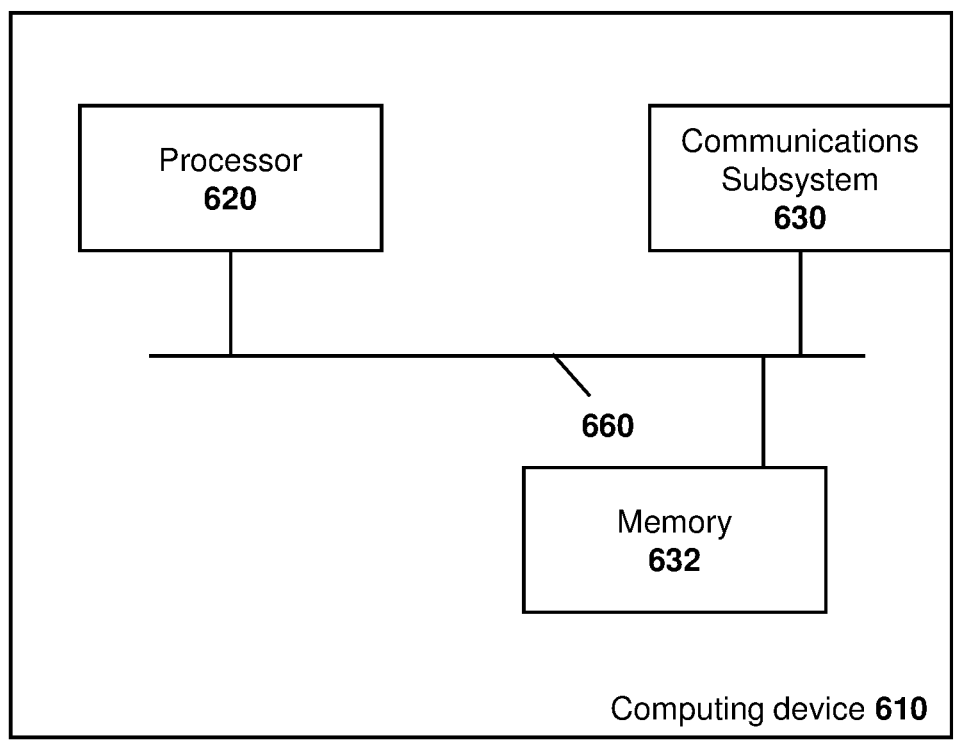
FIG. 6 is a block diagram of a simplified computing device capable of being used with the embodiments of the present disclosure.

In FIG. 6, device 610 includes a processor 620 and a communications subsystem 630, where the processor 620 and communications subsystem 630 cooperate to perform the methods of the embodiments described above. Communications subsystem 630 allows device 610 to communicate with other devices or network elements and may vary based on the type of communication being performed. Further, communications subsystem 630 may comprise a plurality of communications technologies, including any wired or wireless communications technology.

Processor 620 is configured to execute programmable logic, which may be stored, along with data, on device 610, and shown in the example of FIG. 6 as memory 632. Memory 632 can be any tangible, non-transitory computer readable storage medium which stores instruction code that, when executed by processor 620 cause device 610 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 632, device 610 may access data or programmable logic from an external storage medium, for example through communications subsystem 630.

Communications between the various elements of device 610 may be through an internal bus 660 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a computing device comprising:
obtaining a first container image from a host computing device;
executing a second container image at the computing device, the executing comprising:
starting a container from the first container image, the container being for a development environment on the computing device; and
customizing the container for a local environment on the computing device, thereby creating a customized container, wherein the customizing the container comprises:
duplicating local user and group identifiers within the container for allowing read and write access with the local user and group identifiers within the customized container;
automatically importing source code from the host computing device into the container;
automatically importing licenses into the container for the development environment;
automatically mapping artifacts for the development environment within the container; and
mounting the container within a file system on the computing device to allow access to read and write from the container; and
compiling developed code within the customized container.

2. The method of claim 1, wherein the compiling further comprises automatically writing compiling artifacts to the file system on the computing device.

3. The method of claim 1, wherein the customizing uses a configuration file associated with the second container image.

4. The method of claim 3, wherein the first container image and second container image are Docker Images, and wherein the configuration file is a Yet Another Markup Language (YAML) YAML file.

5. A computing device comprising:
a processor; and
a communications subsystem,
wherein the computing device is configured to:
obtain a first container image from a host computing device;
execute a second container image at the computing device, the execution comprising:
starting a container from the first container image, the container being for a development environment on the computing device; and
customizing the container for a local environment on the computing device, thereby creating a customized container, wherein the customizing the container comprises:
duplicating local user and group identifiers within the container for allowing read and write access with the local user and group identifiers within the customized container;
automatically importing source code from the host computing device into the container;
automatically importing licenses into the container for the development environment;
automatically mapping artifacts for the development environment within the container; and
mounting the container within a file system on the computing device to allow access to read and write from the container; and
compile developed code within the customized container.

6. The computing device of claim 5, wherein the computing device is configured to customize the container by automatically importing source code from the host into the container.

7. The computing device of claim 5, wherein the computing device is configured to compile by automatically writing compiling artifacts to the file system on the computing device.

8. The computing device of claim 5, wherein the computing device is configured to customize by using a configuration file associated with the second container image.

9. The computing device of claim 8, wherein the first container image and second container image are Docker Images, and wherein the configuration file is a Yet Another Markup Language (YAML) YAML file.

10. A non-transitory computer readable medium for storing instruction code which, when executed by a processor on a computing device cause the computing device to:
obtain a first container image from a host computing device;
execute a second container image at the computing device, the execution comprising:
starting a container from the first container image, the container being for a development environment on the computing device; and
customizing the container for a local environment on the computing device, thereby creating a customized container, wherein the customizing the container comprises:
duplicating local user and group identifiers within the container for allowing read and write access with the local user and group identifiers within the customized container;
automatically importing source code from the host computing device into the container;
automatically importing licenses into the container for the development environment;
automatically mapping artifacts for the development environment within the container; and
mounting the container within a file system on the computing device to allow access to read and write from the container; and
compile developed code within the customized container.

* * * * *